US008599432B2

(12) United States Patent
Mestha et al.

(10) Patent No.: US 8,599,432 B2
(45) Date of Patent: Dec. 3, 2013

(54) SPOT COLOR PRINTING WITH NON-STANDARD GAMUTS ACHIEVED WITH PROCESS SET POINT ADJUSTMENT

(75) Inventors: Lalit Keshav Mestha, Fairport, NY (US); Tonya L. Love, Rochester, NY (US); Ta-Chen Hsu, San Gabriel, CA (US)

(73) Assignee: Xerox Corporation, Norwalk, CT (US)

( * ) Notice: Subject to any disclaimer, the term of this patent is extended or adjusted under 35 U.S.C. 154(b) by 1007 days.

(21) Appl. No.: 12/127,675

(22) Filed: May 27, 2008

(65) Prior Publication Data

US 2008/0291479 A1      Nov. 27, 2008

Related U.S. Application Data

(63) Continuation-in-part of application No. 11/099,589, filed on Apr. 6, 2005.

(51) Int. Cl.
  *G06F 15/00* (2006.01)
  *G06K 1/00* (2006.01)

(52) U.S. Cl.
  USPC .......... 358/1.9; 358/518; 358/3.23; 358/3.06; 358/515; 358/534; 399/82

(58) Field of Classification Search
  USPC .............................. 358/1.9, 518, 3.23; 399/82
  See application file for complete search history.

(56) References Cited

U.S. PATENT DOCUMENTS

| 5,719,613 | A | 2/1998 | Fukui et al. |
| 5,749,021 | A | 5/1998 | Mestha et al. |
| 5,754,918 | A | 5/1998 | Mestha et al. |
| 5,950,040 | A | 9/1999 | Mestha et al. |
| 5,987,168 | A | 11/1999 | Decker et al. |
| 6,018,636 | A * | 1/2000 | Caruthers ................. 399/57 |
| 6,344,902 | B1 | 2/2002 | Duke et al. |
| 6,525,721 | B1 | 2/2003 | Thomas et al. |
| 6,636,708 | B2 | 10/2003 | Takahashi |
| 6,744,531 | B1 | 6/2004 | Mestha et al. |
| 7,088,469 | B1 | 8/2006 | Sanger et al. |
| 7,110,143 | B2 | 9/2006 | Bares et al. |
| 7,450,281 | B2 | 11/2008 | Torigoe et al. |
| 7,466,446 | B2 | 12/2008 | Arakawa |
| 7,528,989 | B2 | 5/2009 | Nishide et al. |

(Continued)

FOREIGN PATENT DOCUMENTS

| EP | 1 292 102 A2 | 3/2003 |
| JP | 2002-112057 | 4/2002 |

OTHER PUBLICATIONS

Sohail A. Dianat et al., Dynamic Optimization Algorithm for Generating Inverse Printer Maps with Reduced Measurements; Accepted for publication 2006 IEEE International Conference on Acoustics, Speech and Signal Processing. Toulouse, France, May 14-19, 2006.

(Continued)

*Primary Examiner* — Steven Kau
*Assistant Examiner* — Quang N Vo
(74) *Attorney, Agent, or Firm* — Fay Sharpe LLP

(57) ABSTRACT

A color management system is provided for enabling imaging of selected colors called spot colors that document dynamically adjusting the normal printer gamut to achieve extended colors. Developed mass may be increased or decreased by changing set points such as a photoreceptor roll charge, development bias or raster output scanner laser power.

8 Claims, 3 Drawing Sheets

(56) References Cited

U.S. PATENT DOCUMENTS

| | | |
|---|---|---|
| 2002/0008880 A1* | 1/2002 | Dewitte et al. ............... 358/1.9 |
| 2002/0163570 A1 | 11/2002 | Phillips |
| 2003/0184772 A1* | 10/2003 | Agarwal ..................... 358/1.9 |
| 2005/0030560 A1 | 2/2005 | Maltz et al. |
| 2006/0227395 A1 | 10/2006 | Mestha et al. |
| 2007/0002342 A1* | 1/2007 | Morales et al. ............... 358/1.9 |
| 2007/0098430 A1* | 5/2007 | Hoffman et al. ............... 399/82 |
| 2008/0291479 A1 | 11/2008 | Mestha et al. |
| 2008/0291480 A1 | 11/2008 | Mestha et al. |

OTHER PUBLICATIONS

Eli Saber, Sohail Dianat, Lalit K. Mestha, Perry Y. Li; "DSP Utilization in Digital Color Printing", IEEE Signal Processing Magazine, Jul. 2005 pp. 1-7.

* cited by examiner

SPOT COLOR PRINTING WITH NON-STANDARD GAMUTS ACHIEVED WITH PROCESS SET POINT ADJUSTMENT

CROSS REFERENCE TO RELATED PATENTS AND APPLICATIONS

This continuation-in-part application claims the priority benefit of U.S. application Ser. No. 11/099,589, filed Apr. 6, 2005, the disclosure of which is incorporated herein by reference.

TECHNICAL FIELD

The disclosed embodiments generally relate to methods and systems for printer color management in image/text printing or display systems. The embodiments are directed to processes for generating improved spot color accuracy, by varying process set points for extending color gamuts and achieving extended or more variant gamut colors comprising desired spot colors.

BACKGROUND

To meet customer demand, the commercial printing industry requires the capability of producing spot colors accurately and consistently. Spot colors can be defined as a fixed set of colors which may be Pantone® colors, customer logo colors, colors in a customer's proprietary marked patterns, or customer defined colors in the form of an index color table. Spot colors are often used, or can be used, for large background areas, which may be the most color critical portion of a particular page. Consistent color in these areas may determine the difference between success and failure in meeting customer requirements. Customer demands for color accuracy and consistency are typically much tighter for spot colors than for colors within images.

The color gamut of a printer is a multi-dimensional space of a given volume with the axes of the space being set or defined initially by the pigments used in the colorants of the primary colors such as, for example, cyan, magenta, yellow, and black. In forming multi-color output images on an image-receiving medium, each of the primary colors is transferred to the image-receiving medium in turn. The color gamut is defined by the interaction of the primary colors, and is limited by a total amount of toner in any combination that can be effectively deposited on the image-receiving medium. For each system, the toner deposited on the image-receiving medium, such as a photoreceptor, is referred to as DMA (Developed Mass per unit Area). Otherwise, toner transfer to the image-receiving medium will be affected, and the quality of the produced images will be reduced.

In Image-on-Image printers, the actual available color gamut for a particular image forming device not only depends on colorants of the pigments but it is also a function of DMA. The DMA depends on the set points for certain process parameters of each of the separations. The process parameters are, for example, photoreceptor voltages (charged and/or discharged voltages), donor and/or magnetic roll voltages, toner concentrations and the like.

Combinations of set points affect DMA levels thereby defining limits to the color gamut by limiting the developed color combinations that are available from specific mass levels of each of the primary colorants. These set points are developed in sets, the sets of set points and associated color rendition dictionary (CRD) by which images may be produced by the image forming device. CRDs, and their associated set points, are generally experimentally derived for a given image forming device or system. CRDs are appropriately nominalized in order that the CRD and associated set of set points programmed into an image forming device, or family of image forming devices, substantially ensures that the color gamut produced by that image forming device covers, as broadly as possible, an available nominal color spectrum. Typically then, image forming devices are delivered with a single CRD available in the image production system which is defined by the associated set points adjusted in order to center the color gamut. Such a color gamut is referenced herein as the "normal" color gamut.

Occasionally, customers or other end-users of an individual image forming device, or family of image forming devices, may desire to produce and/or reproduce, on a recurring basis, a color or set of colors that lies outside the nominal color gamut available based on the single CRD that comes pre-stored in the image forming device, i.e. the memory or spot colors. CRDs and individual process parameter set points are not, however, user adjustable. Where a user is provided access to a capability in an image forming device to adjust individual set points, predetermined CRDs would be rendered invalid. A likely outcome would be that the color gamuts available to produce output images would be adversely affected.

Producers and suppliers of image forming devices have a capability to experimentally bias and/or skew the color gamut available in their products. Through experimentation, a new CRD may be defined based on a modified set of set points to adjust the color gamut of an image forming device. In such a case, the total volume of the color gamut available from the image forming device is not increased, but it is shifted or skewed. The library of available colors, however, is modified in order that a different or more vibrant single color-based output set of hues (e.g., vibrant red or vibrant blue) may be made available at the expense of potentially available pallets of other hues, (e.g., green and blue hues) to be produced and/or reproduced within the skewed color gamut defined by this modified color rendition dictionary. Using such a skewed gamut at multiple sets of set points, effective color gamut is increased or extended beyond the nominal gamut.

There is a need for spot color printing with such non-standard gamuts achievable by adjustment of the previous set points when such a spot color is beyond the normal color gamut of the printer as set by the primary color pigment colorants, e.g., cyan, magenta, yellow and black.

It would be advantageous to provide a capability within an image forming device, or family of image forming devices, to select from among a plurality of CRDs resulting in temporary selection of an other-than-nominal, individually determined set of set points. Such selection may skew the color gamut available in the image forming device for a particular image production and/or reproduction job or for a particular page including the spot color, in which the customer and/or end-user desires a specifically biased color set at the expense of certain other colors within a color gamut.

There is thus a need for a method to achieve the extended gamut colors by first identifying critical colors/areas from the image that need extension and then running the color control and process control loops in a non-standard print mode to achieve the desired extensions.

For printers that use multiple marking engines for integrated parallel or serial printing, there is also a need for associated control to assure that non-standard gamut spot colors are consistent among a plurality of the engines.

SUMMARY

A method is provided for adjusting a color printer gamut of a printer to encompass a selected spot color wherein the selected spot color is outside of a nominal printer gamut. The selected spot color is identified as not being producible with a first color gamut of the printer. The selected spot color is compared to predetermined spot colors identified as reproducible by the printer in a color set point index table. The set of set points from the set point index table corresponding to the nearest color to the selected spot color are identified. The printer is set to the identified set of set points and then calibrated so the printer can print the selected spot color.

In accordance with another embodiment, an image based method is provided for extending a color printer gamut of a printer to encompass a selected spot color. The selected spot color is defined out of a normal color gamut with a printer and reproducible with an extended color gamut. The selected spot color is then identified as to be included on an image to be printed. A color rendition dictionary corresponding to the extended color gamut is identified for reproducing the selected spot color and further identifying process set points to achieve the extended color gamut. The printer is set to identify process set points for the images printed.

In accordance with another embodiment, the printer comprises a plurality of marking engines, each of which may be called upon to generate a selected spot color falling out of their normal color gamut. if so, then each engine obligated to resort to a non-standard gamut will identify process set points to a nearest color to the spot color and then calibrate to accurately generate the desired spot color. Spectrographic measurements assure consistency among all the engines.

DETAILED DESCRIPTION

The following description of various exemplary embodiments of systems and methods for color gamut skewing within an image forming device may refer to one specific type of image forming device, such as an Image-on-Image (IOI) printer, for the sake of clarity, familiarity and ease of description. However, it should be appreciated that the disclosed principles may be equally applied to any image forming device that is usable to produce and/or reproduce color images particularly as hard-copy output images on an image-receiving medium. Such devices may include, but are not limited to, copiers, printers, scanners, facsimile machines, xerographic image forming devices, and/or any other now known or later-developed system or device for producing, reproducing and/or potentially transmitting or receiving color images.

Figure 1:
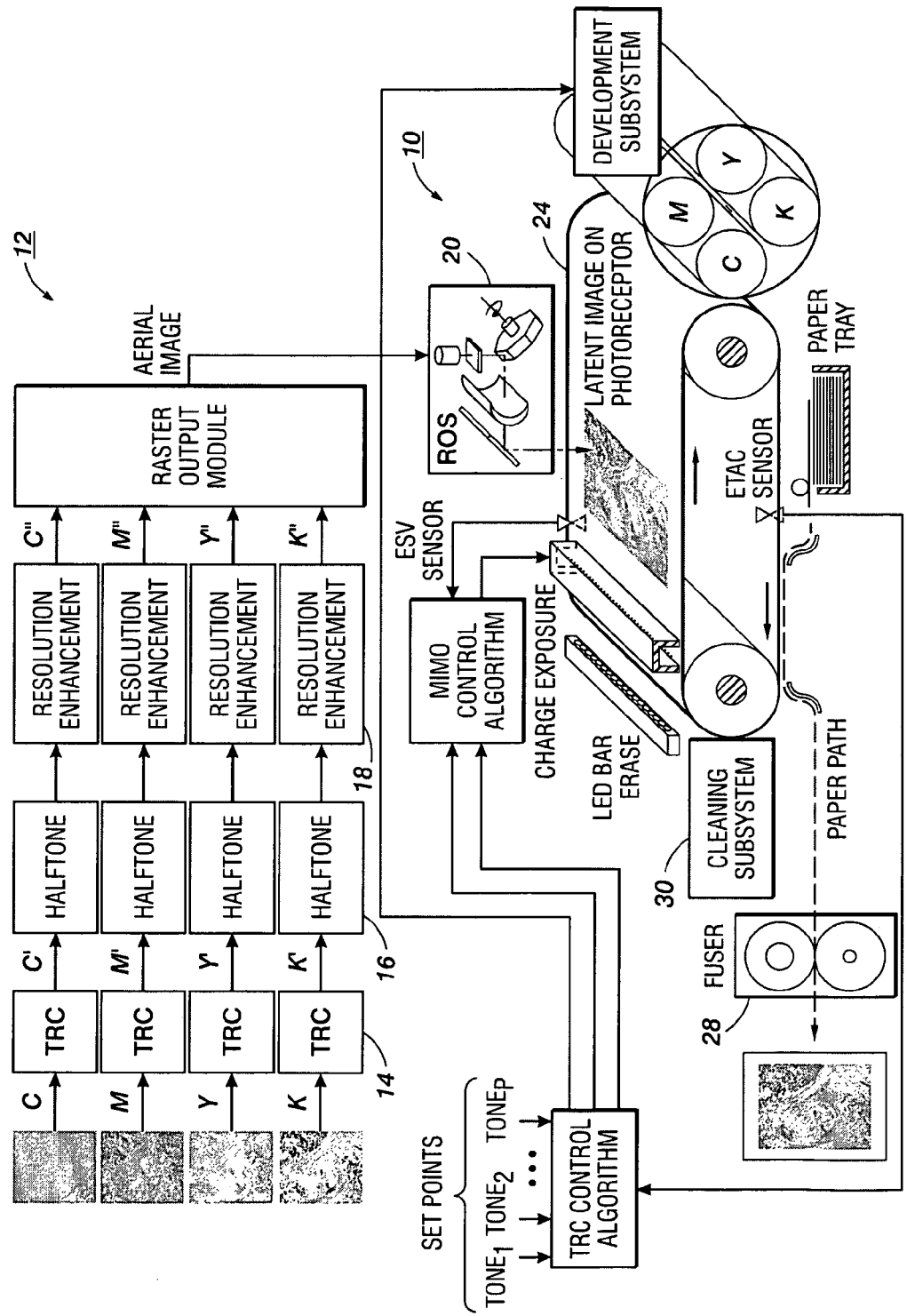
FIG. 1 is a schematic diagram of a marking engine/printer.

With reference to FIG. 1, print engine 10 includes, a DFE (digital front rod) 12 or a network of DFEs from multiple vendors to convert the electronic "master" documents (through a series of signal processing applications such as segmentation, rasterization, color management, image enhancement, and anti-aliasing) from their device-independent form to a format that is specifically designed and optimized for the intended printing system. To this effect, the input document is transformed from its PDL (page description language) format (such as PS) ("Post Script") to cyan (C), magenta (M), yellow (Y), and black (K) color separations to be printed by the engine. This is done by first utilizing an interpreter (e.g., PS interpreter) to identify the commands found in the PDL. An imaging module then generates a rasterized format of the PDL document at the correct print engine resolution (e.g., 600 dots/in). The above is usually referred to as raster image processing (RIP). During the RIP, color rendering dictionaries (CRDs), optimized a priori for the engine at hand, are employed by the color management module to transform the color from RGB or L*a*b* formats to CMYK separations. Some DFEs employ object-oriented rendering (OOR) algorithms intended to enhance the color reproduction by utilizing custom CRDs for specific image objects (such as a "skin" CRD for fleshtone or a "sky" CRD for blue skies). For OOR to be effective, segmentation algorithms must be utilized to identify the objects of interest. Once the RIP is complete, the input job is transformed from a PDL format to CMYK separations ready for engine consumption. The separations are usually generated at the engine resolution (e.g., 600 dpi) for a given paper size (e.g., 8.5×11 in), where each separation is made up of 8b/pixel.

The print engine, also referred to as the "marking engine," is designed to convert the electronic CMYK media provided by the DFE into hardcopy color prints. FIG. 1 illustrates a typical digital press or printing system based on the principles of electrophotography (EP). Invented by Chester Carlson in 1938, EP is utilized today as a key technology for high-volume digital color printing. The CMYK digital data (typically 8 b/pixel/channel) submitted from the DFE are processed through appropriately designed tone reproduction curves 14, halftoned 16, resolution enhanced 18, and then submitted to the raster output scanner (ROS) 20 for imaging and printing. The digital printing process revolves around a circulating photoreceptor (PR) 24 in the form of a belt or a drum. The photoreceptor is light sensitive, so that it is insulating in the absence of light and conductive in the presence of light.

The first step in the EP process is "charging," where a high-voltage wire deposits electrons or ions on the PR in the dark, causing a uniform charge buildup. The CMYK separations provided by the DFE are then utilized to selectively expose, through the use of raster output scanners (ROS) 20, the charged PR drum 24 or belt according to the binary halftoned image pattern. The resulting spatial charge distribution, called the latent image, corresponds to the desired image to be printed. It is then "developed" by depositing oppositely charged toner particles exclusively in the charged regions, thus forming a toned image on the photoreceptor. The toned image is "transferred" to paper by electrostatic forces and made permanent by "fusing," a process in which heat and pressure are applied to melt the toner particles and adhere them to the paper. Finally, the photoreceptor is "cleansed" mechanically and electrostatically of left-over particles and recirculated to the charging system for the next image, in the finishing (postpress) stage.

Figure 2:
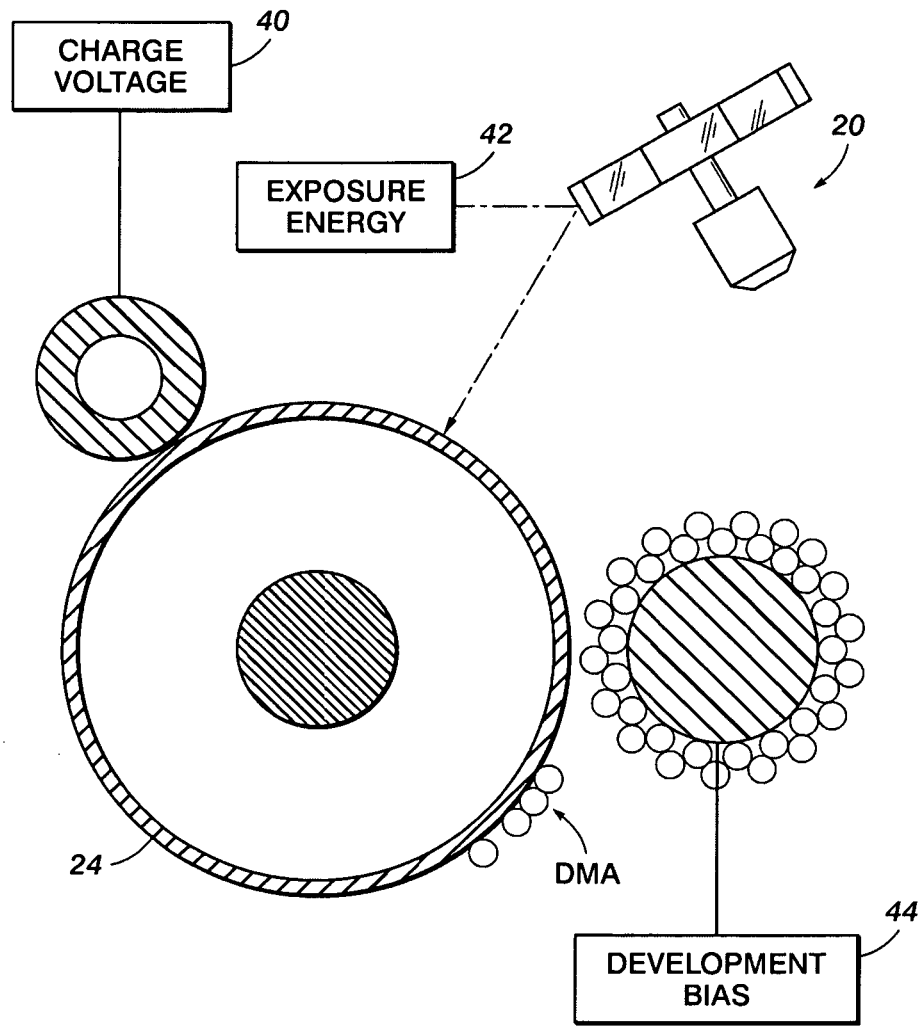
FIG. 2 is a simplified version of FIG. 1 emphasizing the principal elements of the development system affected by process set points.

With reference to FIG. 2, the principal print process parameters that can be adjusted to extend the color gamut of the printer are isolated for simplicity of explanation. As noted above, if the DMA is adjusted, by adjusting process set points, print colors can be generated outside of the nominal printer gamut. FIG. 2 shows three principal process set point parameters which can be adjusted to achieve a gamut extension; a photoreceptor chargeable (or dischargeable) 40, a laser intensity exposure energy 42 and development bias (donor voltage) 44. Process set points for all three parameters can conceivably vary between minimum, nominal and high values to achieve memory or spot colors outside of the normal printer gamut, with the normal gamut corresponding to the nominal parameter values and outside of gamut spot colors corresponding to either minimum or high values of these process actuators. The embodiments are also intended to include sorted combinations of minimum, nominal or high values of the process actuators to further achieve any desired spot color printing capabilities.

Figure 3:
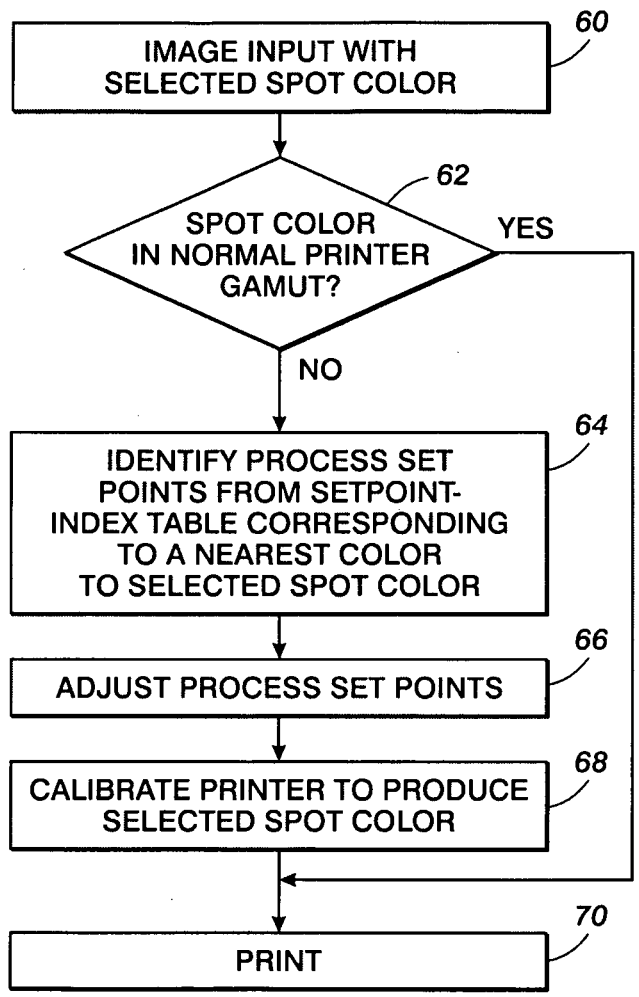
FIG. 3 is a flowchart of a method for printing with non-standard gamuts achieved with process set point adjustment.

With reference to FIG. 3, embodiments for implementing normal printer gamut extensions are illustrated.

Where a print job is identified to include an image having a selected spot color 60 which is determined to be outside 62 of the normal printer gamut, the printer gamut needs to be extended by process set point adjustment. The customer can specify the location in the image and the color that requires accurate extension reproduction. Often times a user designates by user interface (not shown) the color by clicking on the image element (specific pixel) and then on the name on a pull down menu. The color (or objects) so selected is subsequently designated as a spot or memory color to enable an aggressive print mode. Alternatively, the operator can select a default option where he clicks on the menu name, such as for example "aggressive red". It is possible that a special built-in halftone screen/TRC may be required for printing such colors. All these are collected as part of the parameters required while reproducing these colors even though they are non-standard print mode.

If the spot colors were not seen before by the printer, then the CMYKs/L*a*b* values of the selected spot color are compared 64 to those shown in a memory color—set point index table to identify the set points corresponding to the nearest color that matches the select spot color. This can be done by comparing the Euclidian distance between the desired spot color and the color-mixed index table and picking the one with the smallest number. Inline spectrophotometers may be used to obtain color corrected CMYK values for the selected spot colors.

In order to create the correct CMYK values for the selected spot color based on the state of the printer, color corrections are required for the selected spot color, the test pages for printing and measuring memory colors on the non-standard gamuts are created using the color descriptions from the memory color table corresponding to the identified process set points. In other words, the prints are executed by controlling the process through the new set points selected from the set point index table. The colors are measured and new CMYK values are obtained using known iterative techniques (U.S. Pat. No. 6,744,531), so that the printer is ultimately calibrated 68 to produce the selected spot color as requested by the user.

Lastly, the new CMYK values of the selected spot colors are inserted 70 in the customer document at the right quarter point in the image. The customer job is tagged with information related to the desired set points.

The foregoing adjustments are preferably executed during proofing/make-ready shifts. During a normal print run the job is then printed with the adjusted process set points to produce the desired selected spot color. After the page is printed with the selected spot color, nominal process set points are returned to the marking engine and the printer operates in its nominal color gamut.

Alternatively, the color rendition dictionary corresponding to the extended color gamut can be used for identifying the process set points, thereby avoiding the calibration from a nearest color to the selected spot color. In other words, a color rendition dictionary corresponding to the extended color gamut encompassing the selected spot color is used to reproduce the selected spot color by identifying the adjusted process set points from the extended color rendition dictionary to achieve the extended color gamut. A collection of such color rendition dictionaries can be built up over time for a particular printer for selected spot colors falling outside of the nominal printer gamut.

The subject embodiments have special application to a printer comprising a plurality of serial or parallel printing marking engines where the selected spot color is out of the standard gamut of any of the marking engines. In such an instance, the engine of FIG. 1 would be housed in a plurality of locations within the printer, and for purposes of brevity and simplicity, a plurality of such engines are not shown in a figure, but any such figure would should the plurality of engines associated with a controller for assuring the selected spot color is generated in any of the engines.

More particularly, when imaging the selected spot color between a plurality of engines is required, similar to the above, a first step is required to identify whether the selected spot color is reproducible in a normal printer gamut for all the engines. It is conceivable that a normal gamut of one engine may be able to produce a selected spot color, while a normal gamut of a second engine may not. In the case where the engine cannot generate the selected spot color, process set points for that non-standard gamut printer could be used from the set point index table in the second print engine corresponding to a nearest color to the selected spot color. In a multiple engine printer, the process set points in a first print engine for generating the selected spot color may not be the same as the process set points in a second print engine to generate the selected spot color. Special photographic measurement is used to accurately identify generated selected spot colors in any of the engines. Serially, calibration of the engine by a colorant adjustment at the nearest process set points is performed so that the printer can reproduce the selected spot color accurately, if needed, and then make prints to create the spot color with a non-standard gamut in the second print engine. After a page is printed with the selected spot color, normal process set points are returned to the second marking engine and the printer would then operate in its normal color gamut for the rest of the print job or until another non-standard mode is called for.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for adjusting a color printer gamut of a printer to encompass a selected spot color, comprising:
   identifying by a digital front end (DFE) the selected spot color as not producible with a first color gamut of the printer;
   comparing by the DFE the identified selected spot color to predetermined spot colors identified as reproducible by the printer in a color set point index table;
   identifying by the DFE a set of set points from the set point index table corresponding to a nearest matching predetermined spot color, the identifying including:
      comparing a Euclidean distance between the identified selected spot color and colors in the set point index table, and
      determining the nearest color as one having a smallest Euclidean distance;
   setting by the DFE the printer to the identified set of set points, the setting including:

adjusting a value for at least one print process parameter corresponding to that of at least one set point of the nearest matching predetermined spot color for achieving the identified selected spot color outside of a nominal printer gamut; and, calibrating by the DFE the printer to print the identified selected spot color.

2. The method of claim 1 wherein the print process parameter includes one or more of a photoreceptor voltage including a charged or discharged voltage, a donor and mag roll voltage toner concentration, photoreceptor charge or laser power.

3. The method of claim 1 further including compiling the set point index table by mapping a plurality of spot colors represented by assigned indicators to test process set points.

4. The method of claim 3 wherein the test process set points are different than nominal operating set points.

5. The method of claim 1 wherein the calibrating includes converging CMYK values from the set of set points corresponding to the nearest color to CMYK calibrated values corresponding to the identified selected spot color.

6. The method of claim 5 wherein the identified selected spot color is defined in a printer look-up-table by the identified set of set points and the CMYK calibrated values.

7. The method of claim 1 wherein the printer comprises a plurality of marking engines for integrated parallel or serial printing and the calibrating comprises generating the identified selected spot color in the plurality of the marking engines.

8. The method of claim 7 wherein a first set of set points in a first engine of the plurality of marking engines to generate the identified selected spot color is different than a second set of set points to generate the identified selected spot color in a second engine of the plurality of marking engines.

* * * * *